J. H. OSTRANDER.
NOSE GUARD OR CLIP FOR EYEGLASSES.
APPLICATION FILED NOV. 22, 1906.
906,154.
Patented Dec. 8, 1908.
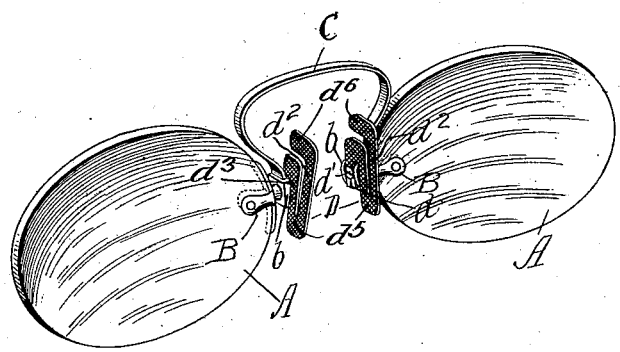
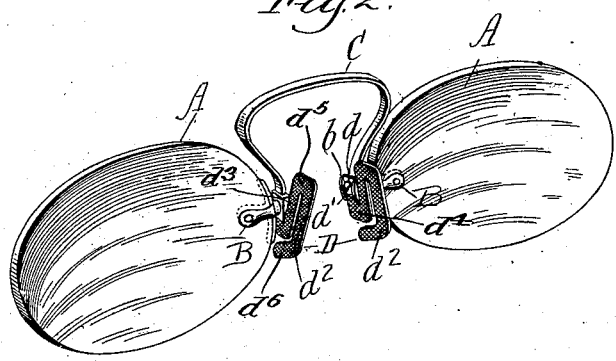
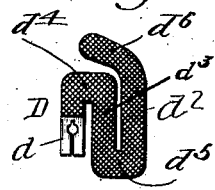 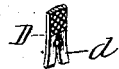
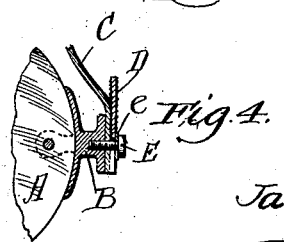
Witnesses
Harry R. White
Ray White
Inventor
James H. Ostrander
By Mathieson Fields,
Atty

UNITED STATES PATENT OFFICE.

JAMES HENRY OSTRANDER, OF CHICAGO, ILLINOIS.

NOSE GUARD OR CLIP FOR EYEGLASSES.

No. 906,154.  Specification of Letters Patent.  Patented Dec. 8, 1908.

Application filed November 22, 1906. Serial No. 344,651.

*To all whom it may concern:*

Be it known that I, JAMES HENRY OSTRANDER, a citizen of the United States, and a resident of the city of Chicago, in the county of Cook and State of Illinois, have invented certain new and useful Improvements in Nose Guards or Clips for Eyeglasses; and I do hereby declare that the following is a full, clear, and exact description of the same, reference being had to the accompanying drawings, and to the letters of reference marked thereon, which form a part of this specification.

In constructing and fitting eye glasses of that class held in place by the action of a bridge spring it has heretofore been necessary to keep in stock a large number of different styles of nose guards or clips to enable the oculist to fit his patients. This is partly because of the different shapes of noses which necessitate a different application of the eye glasses and frequently because of the use for which the eye glasses are required. For instance for reading, study and close work generally the glasses are applied rather low and for distance work as when the glasses are worn continuously the glasses are worn high as possible to bring the lenses directly before the eyes. The clips or guards heretofore have not been made adaptable for general use independently of the shape of the nose and the manner of wearing the glasses and in consequence a large and quite expensive assortment of nose guards of different shapes, sizes and angles is required.

The object of this invention is to construct a nose guard or clip for the purpose specified adapted to afford a relatively long bearing upon the nose of the wearer and of such a construction that a resilient contact is maintained by the guard or clip itself.

It is also an object of the invention to construct a spring guard or clip either side of which may be arranged for bearing contact and in which the point of greatest resiliency may be either above or below the post by which secured to the lenses.

Finally it is an object of this invention to construct a reversible and interchangeable nose guard or clip adaptable for universal use and capable of being applied to eye glasses howsoever worn and to be fitted easily to any nose to which such eyeglasses can be applied at all.

The invention consists in the matters hereinafter described and more fully pointed out and defined in the appended claims.

In the drawings: Figure 1 is a perspective view of a pair of eye glasses provided with guards or clips embodying my invention. Fig. 2 is a similar view with the guards differently adjusted. Fig. 3 is a plan view of one of the guards or clips. Fig. 4 is an enlarged sectional view of the post, spring and guard. Fig. 5 is a perspective view of the guard taken at its engaging end.

As shown in the drawings: A indicates the lenses which of course are of the usual or any desired type and B indicates the posts which may be secured directly to the lenses as shown or to the metallic rims encircling the lenses. Connecting said posts and seated at its opposite ends in the usual slots in the inner extremities of the posts is the bridge spring C whereby the lenses are adjusted relatively to each other and the desired pressure maintained to support the lenses in place when in use. The lenses are held rigidly on said springs by means of the lateral flanges $b$ provided one on each side the post at its end and between which the ends of the spring are engaged.

The nose guard or clip indicated as a whole by D comprises as shown an approximately flat plate milled on both sides and shaped or slitted to afford resiliency and to provide an attaching end portion $d$ provided with an aperture to receive the screw $d'$ whereby the clip and spring are engaged to the post. Said clip or guard may vary in shape but as shown is in the form of a strip or flat bar shaped to provide comparatively long parallel bars or folds $d$—$d^2$—$d^3$ extending longitudinally of the clip and short transverse bars or folds $d^4$—$d^5$ which integrally connect corresponding ends of two adjacent long longitudinal parallel bars. Integral with the bar $d^2$ is an extension or integral bar $d^6$, which, as shown, is curved or inclined transversely over the bars $d$—$d^3$ and directed toward the attaching end but may, of course, be directed at any other suitable angle or direction. By the foregoing description it is seen that the guard comprises alternating longitudinal and transverse bars or folds, all integrally connected with an extension or bar directed outwardly in the general plane of the guard. As shown, the guard or clip is roughly S-shaped with the free extremity thereof curved inwardly toward the attaching end.

The operation is as follows: When engaged in place as shown in Fig. 1 with the attaching end directed downwardly the free end with its obliquely incurved extremity extends upwardly engaging high on the nose or at the arch of the brow thus supporting the eye glasses for close use directly before the eyes. When it is desired to attach the glasses higher on the nose as for street or constant use the guards are released from the posts and turned over as shown in Fig. 2 with the attaching end directed upwardly and consequently the free end directed downwardly with the transverse extremities directed inwardly and affording a long and yielding bearing upon the nose. The guard may also be used on either side of the nose, thus being interchangeable as well as reversible.

Owing to the peculiar construction of the guards and the fact that the same are constructed of metal capable of being bent or shaped at the will of the operator any desired conformation of the guard can be secured to insure an exact fit to apply the necessary pressure uniformly either high or low on the nose as desired. It therefore follows that the clips are capable of universal use.

To enable the guard to be rigidly secured to the plate and to prevent the loosening of the post screw I have constructed the attaching end of the clip to afford spring pressure against the action of the screw. For this purpose the attaching end is slitted centrally and longitudinally inward through and slightly beyond the screw aperture and the slitted ends are sprung oppositely from the plane of the guard or clip to a slight extent as shown in Fig. 5. It follows that when secured in place by the screw E, the head thereof or if desired a small washer e beneath the head forces said bent ends again into the plane of the clip with the effect of cramping the screw slightly and rigidly holding the same from retraction. Of course if desired the washer may be dispensed with particularly in the arrangements wherein the attaching ends are directed upwardly in which case if desired the attaching ends of the clip may be secured between the post and the end of the spring.

Obviously the general conformation or shape of the guard may vary and the same may of course be constructed otherwise than by stamping and instead of affording approximately parallel straight folds or bends the same may be more or less rounded and various details of construction may be varied without departing from the principles of my invention.

I claim as my invention:

1. A nose guard or clip consisting of a flat strip of suitable metal shaped to provide a plurality of continuous edgewise folds and bends lying in the same plane and one end of the strip apertured and the opposite extremity of the strip directed toward the apertured end.

2. A nose guard or clip comprising a flat strip of metal, one extremity adapted for attachment to a post, said strip between the extremities folded edgewise to provide a plurality of bars lying in substantially the same plane when in use and a curved extension integral with one of the bars.

3. A nose guard or clip consisting of parallel long flat bars approximately equal in length, short transverse bars connecting corresponding ends of adjacent parallel long bars and a bar integral with one of the aforesaid bars and extending outwardly therefrom and all of said short and long bars arranged edgewise.

4. A nose guard or clip comprising long parallel bars and transverse bars alternating therewith, said transverse bars also being parallel and each transverse bar connecting the ends of two long parallel bars and an extension integral with one of the bars providing increased bearing surface.

5. A nose guard or clip of the class described embracing a relatively thin resilient bar shaped to afford a plurality of bends, one end of the bar being apertured to receive the post screw and both sides of the clip being roughened to thereby admit of inverting the clip.

6. A device of the class described embracing a plate milled on both sides and shaped to afford a substantially S shaped guard, the folds of which are approximately parallel, one of the ends of the guard being apertured to admit of attachment to the post, said end being slitted beyond the aperture and sprung to clamp the post screw when in place.

7. In a device of the class described a bar roughened on opposite sides and bent upon itself a plurality of times, and having substantially parallel attaching and free ends, the latter of which at its extremity is directed inwardly toward the attaching end, said attaching end being apertured and affording a spring whereby the post screw is held from retraction.

8. A nose guard or clip having a plurality of parallel turns and its free and attaching ends parallel and the extremity of the free ends directed at an angle therewith, said nose guard adapted to be reversed on the same side of the nose to direct the free end upwardly or downwardly thereby varying the angle of the lenses.

9. A nose guard comprising a bar, a transverse fold, a bar parallel to the first named bar, a transverse portion or fold at one extremity thereof, a bar parallel with the aforesaid bars and a bar integral therewith and curved over corresponding ends of the first named bars.

10. A nose guard consisting of a strip of metal having short bars or folds and long bars or folds, an apertured attaching portion at one side of the guard and a part at the opposite side of the guard directed toward the attaching portion and at an angle outwardly therefrom providing increased bearing surface.

11. A nose guard formed of a multiplicity of integral folds or bends all formed of one strip of metal and each of which provides a bearing on the nose and acting reciprocally to withstand the pressure of the glasses thereon and a part or end directed outwardly from one of the folds or bends affording increased bearing surface for the guard.

In testimony whereof I have hereunto subscribed my name in the presence of two subscribing witnesses.

JAMES HENRY OSTRANDER.

Witnesses:
K. E. HANNAH,
G. W. DANZ.